US007524108B2

(12) United States Patent
Yoshida et al.

(10) Patent No.: US 7,524,108 B2
(45) Date of Patent: Apr. 28, 2009

(54) THERMAL SENSING CIRCUITS USING BANDGAP VOLTAGE REFERENCE GENERATORS WITHOUT TRIMMING CIRCUITRY

(75) Inventors: Munehiro Yoshida, Austin, TX (US); David William Boerstler, Round Rock, TX (US)

(73) Assignees: Toshiba American Electronic Components, Inc., Irvine, CA (US); International Business Machines Corporation, Armonk, NY (US)

( * ) Notice: Subject to any disclaimer, the term of this patent is extended or adjusted under 35 U.S.C. 154(b) by 1336 days.

(21) Appl. No.: 10/441,726

(22) Filed: May 20, 2003

(65) Prior Publication Data

US 2004/0233600 A1 Nov. 25, 2004

(51) Int. Cl.
*G01K 7/01* (2006.01)
*G05F 3/02* (2006.01)

(52) U.S. Cl. ........................ 374/178; 374/171; 327/313; 702/130

(58) Field of Classification Search ......... 374/170–173, 374/178; 327/100, 142, 161, 162, 166, 539, 327/542, 512, 513; 323/313, 311, 316; 702/130–136
See application file for complete search history.

(56) References Cited

U.S. PATENT DOCUMENTS

| | | | | | |
|---|---|---|---|---|---|
| 5,270,591 | A | * | 12/1993 | Ross | 327/57 |
| 5,933,045 | A | * | 8/1999 | Audy et al. | 327/513 |
| 6,008,685 | A | * | 12/1999 | Kunst | 327/512 |
| 6,037,807 | A | * | 3/2000 | Wu et al. | 327/52 |
| 6,172,555 | B1 | * | 1/2001 | Gusinov | 327/539 |
| 6,177,788 | B1 | | 1/2001 | Narendra et al. | |
| 6,381,491 | B1 | | 4/2002 | Maile et al. | |
| 6,411,158 | B1 | * | 6/2002 | Essig | 327/539 |
| 6,462,612 | B1 | | 10/2002 | Roh et al. | |
| 6,501,256 | B1 | | 12/2002 | Jaussi et al. | |
| 6,816,351 | B1 | * | 11/2004 | Frank et al. | 361/103 |
| 7,228,508 | B1 | * | 6/2007 | Pippin | 716/1 |
| 2003/0006747 | A1 | * | 1/2003 | Jaussi et al. | 323/315 |
| 2006/0028193 | A1 | * | 2/2006 | Migliavacca | 323/316 |
| 2008/0018317 | A1 | * | 1/2008 | Chen et al. | 323/313 |
| 2008/0074172 | A1 | * | 3/2008 | Marinca | 327/539 |

FOREIGN PATENT DOCUMENTS

| | | |
|---|---|---|
| JP | 11-134048 | 5/1999 |
| JP | 2003-77295 | 3/2003 |
| JP | 2003-173212 | 6/2003 |

* cited by examiner

*Primary Examiner*—Gail Verbitsky
(74) *Attorney, Agent, or Firm*—Hogan & Hartson LLP

(57) ABSTRACT

Methods, systems and thermal sensing apparatus are provided that use bandgap voltage reference generators that do not use trimming circuitry. Further, circuits, systems, and methods in accordance with the present invention are provided that do not use large amounts of chip real estate and do not require a separate thermal sensing element.

19 Claims, 14 Drawing Sheets

THERMAL SENSING CIRCUITS USING BANDGAP VOLTAGE REFERENCE GENERATORS WITHOUT TRIMMING CIRCUITRY

BACKGROUND

The present invention relates generally to thermal sensing circuits with voltage reference circuits, and more specifically thermal sensing circuits implementing bandgap voltage reference circuits.

Thermal sensing circuits are sometimes utilized to monitor substrate temperature in electronic systems. For example, a thermal sensing circuit can be used to monitor a substrate temperature of a chip or processor. When the substrate temperature exceeds a predetermined temperature threshold, the thermal sensing circuit might, for example, signal circuitry of a computer system so that corrective action, such as throttling back or shutting down the processor, may be taken to reduce the temperature. Otherwise, the processor could overheat and cause the processor to fail.

Thermal sensing circuits are typically fabricated on a separate discrete integrated circuit, or chip, and are coupled to one or more external pins of the processor. Using these external pins, the thermal sensing circuit can bias a thermal sensing element, such as a diode, of the processor into forward conduction and sense an analog voltage across the thermal sensing element. The thermal sensing circuit may convert the analog voltage into a digital value that reflects the substrate temperature. The thermal sensing circuit can then determine when the substrate temperature surpasses a specified temperature threshold.

FIG. 1 is a block diagram of a conventional thermal sensing circuit that includes a trimming circuit 5, a reference voltage generator 10 that generates a reference voltage which corresponds to a fixed thermal threshold, a thermal sensing element 30 that generates a base-to-emitter voltage that is proportional to temperature, a comparator 40 that compares the reference voltage to an output voltage of the thermal sensing element, and a control circuit 50 that generates an indicator signal when the temperature that is sensed exceeds a thermal threshold T1.

FIG. 2A is a graph of bandgap reference voltage and base-to-emitter voltage as a function of temperature. As shown in FIG. 2A, the thermal threshold T1 is determined by the intersection of the bandgap reference voltage and the base-to-emitter voltage Vbe. Accordingly, the temperature threshold T1 can be increased by lowering the reference voltage or can be decreased by increasing the reference voltage.

FIG. 2B is a timing diagram that shows the relationship between timing of an indicator signal generated by the thermal sensing circuit of FIG. 1 and temperature. As shown in FIG. 2B, the temperature threshold T1 is significant, since the intersection of the temperature threshold line with the measured temperature plot (shown as a triangle shaped signal) determines the points at which the indicator signal OUTPUT_SIGNAL will transition from a low level to a high level and from a high level to a low level. The indicator signal OUTPUT_SIGNAL transitions from a low level to a high level when the measured temperature plot (shown as a triangle shaped signal) has a positive slope (i.e., increasing temperature) above temperature threshold T1 and transitions from a high level to a low level when the measured temperature plot has a negative slope (i.e., decreasing temperature) below temperature threshold T2.

Bandgap voltage reference circuits are sometimes utilized to provide stable reference voltages that do not vary despite temperature variations. Bandgap voltage reference circuits utilize the characteristics of the bandgap energy of a semiconductor material to provide a stable reference voltage. The bandgap energy of a semiconductor material is typically a physical constant at zero degrees Kelvin. However, as the temperature of the semiconductor material rises from zero degrees Kelvin, the bandgap energy of the material decreases, and a negative temperature coefficient is displayed.

The voltage across a forward biased PN junction generally provides an accurate indication of the bandgap energy of a material. As the temperature of the semiconductor material increases, the voltage across a forward biased PN junction will decrease at a rate which depends upon the cross-sectional area of the particular PN junction and the specific semiconductor material being used.

Two forward biased PN junctions that are made of the same semiconductor material, but that have different cross-sectional areas, will have voltages that vary at different rates when the temperature of their respective PN junctions change. Nevertheless, these voltages can be traced back to the same bandgap voltage constant at absolute zero.

Conventionally constructed bandgap voltage reference circuits can utilize the voltage relationships (between these two forward biased PN junctions) to achieve a relatively temperature insensitive output voltage. Examples of such circuits are shown in FIGS. 3 and 5A-5C, which are discussed in greater detail below. Such bandgap voltage reference circuits utilize a feedback loop in conjunction with an operational amplifier, that is utilized as a differential amplifier, to generate a reference voltage. The feedback loop maintains two input nodes of the differential amplifier at approximately the same potential at steady-state. The non-inverting input of the differential amplifier can be coupled to a reference potential through a first PN junction, such as a diode or transistor. The inverting input of the differential amplifier can then be coupled to the reference potential through a resistor and a second PN junction that has a larger cross-sectional area than the first PN junction. The second PN junction can be constructed using a plurality of the first PN junctions, such as an array of diodes connected in parallel.

During circuit operation, substantially equal currents are forced through the first and second PN junctions. By selecting appropriate component values, a bandgap voltage reference circuit can be provided that balances the negative temperature coefficient associated with the first PN junction with a positive temperature coefficient associated with the difference in the PN junctions to thereby generate a relatively temperature insensitive output voltage.

FIG. 3 illustrates a conventional bandgap reference generator circuit 10. The bandgap reference generator circuit 10 includes an amplifier 11, a positive voltage supply rail 8, a negative voltage supply rail 9, a current source transistor 12, a resistor 13, a diode 14, a resistor 15, a resistor 16, and a diode array 17A-17N. The amplifier has two input signals, voltage Va and voltage Vb, which are fedback from nodes 2 and 3, respectively, to form a control loop. The output of the amplifier 11 is connected to and drives the gate of transistor 12 with a bias voltage which causes a current to flow through resistors 13, 15, 16 to generate voltages Va, V6, Vref, respectively.

The source/drain of transistor 12 is coupled to a positive voltage supply rail 8, and the drain/source of transistor 12 is coupled between resistor 13 and resistor 15. Resistor 13 is coupled to the anode of diode 14 and the cathode of diode 14 is connected to negative voltage supply rail 9. Voltage Va is generated at node N2 between resistor 13 and diode 14. Resistor 15 is connected in series to resistor 16 to form a voltage divider, which is connected to diode array 17A-17N. Voltage Vb is generated at node N3 between resistor R2 and resistor R3. The output of resistor 16 is coupled to the anode of diode array 17A-17N. The cathodes of each diode in the array 17A-17N is connected to negative voltage supply rail 9. The reference voltage Vref at node N1 is approximately 1.25 volts.

FIG. 4 is an electrical schematic of a conventional thermal sensing element circuit. As shown in FIG. 4, the thermal sensing element 30 comprises a constant current source 32 that is coupled to a diode 34 which has a negative temperature coefficient. The base-to-emitter voltage Vbe is measured at the node between the constant current source 32 and the anode of diode 34. The cathode of diode 34 is coupled to the negative voltage supply rail 9.

In designing such circuits, the stability of the reference voltage over voltage, process and temperature variation, among other factors, are very important to consider with respect to the temperature threshold. Generally, thermal sensing circuits are so affected by process variations that the calibration is required via fuse trimming/programming circuitry 5.

Integrating both the bandgap reference circuit 10 and the diode 34 is often very difficult since the 1.25 volt voltage of the bandgap reference circuit 10 is too high in comparison with the base-to-emitter voltage Vbe of diode 34. Moreover, the reference voltage generated by conventional bandgap reference circuits 10 tends to be fixed at a value of approximately 1.25 volts, which essentially eliminates any flexibility of the thermal threshold T1.

FIG. 5A is an electrical schematic of another conventional bandgap reference voltage generator circuit in which the value of the reference voltage can be set to either 1.25 volts or 1.25 volts * ratio of resistor 19 to resistor 13A. As shown in FIG. 5A, the bandgap reference generator circuit 10 includes an amplifier 11, an NPN transistor 12A, 12B, 12C, resistors 13A, 16, 18, 19, a diode 14 and a diode array 17A-17N. Amplifier 11 is responsive to inputs Voltage A and Voltage B. The output of amplifier 11 biases transistors 12A, 12B, 12C since the gates of transistors 12A, 12B, 12C are connected. The source/drain of transistors 12A, 12B and 12C are all coupled to positive voltage supply rail 8. The drain/source of transistor 12A is coupled to node N1 which is connected to a parallel combination circuit that includes resistor 13A and diode 14. Voltage Va is generated at node N1. The diode 14 is connected between the node and the negative voltage supply rail 9.

The drain/source of transistor 12B is connected to node N2 which is connected, to a parallel combination circuit that includes diode array 17A-17N, resistor 16, and resistor 18. Resistor 16 is connected between node N2 and the anodes of each diode 17A-17N. The cathodes of diodes 17A-17N are connected to the negative voltage supply rail 9. Resistor 18 is connected between node N2 and ground. Voltage Vb is generated at node N2 and feedback to the amplifier 11.

The reference voltage Vref is measured at node N3 connecting the drain/source of transistor 12C to resistor 19, which is connected to the negative voltage supply rail 19. The bandgap reference circuit shown in FIG. 5A allows the reference voltage Vref to be changed between 1.25 volts and another discrete voltage that is the product of 1.25 volts and the ratio of resistor 19 and resistor 18. This allows the reference voltage Vref to have two distinct values.

FIG. 5B is an electrical schematic of another conventional bandgap reference voltage generator circuit in which the reference voltage can be set to either 1.25 volts or the product of 1.25 volts and the ratio of resistor 19 to resistor 20. This bandgap reference circuit includes the first amplifier 11A, second amplifier 11B, transistors 12A, 12B, 12C, 12D and 12E, a positive voltage supply rail 8, a negative voltage supply rail 9, a diode 14, a diode array 17A-17N, resistors 16, 19, and output resistor 20. The gate of transistor 12A is coupled to the gate of transistor 12B which is coupled to the gate of transistor 12C. The gate of transistor 12D is coupled to the gate of transistor 12E. In this embodiment, the first amplifier 11A has inputs Va and Vb, and the output of amplifier 11A drives the gates of transistors 12A, 12B, 12C. Similarly, the second amplifier 11B has inputs of Va and Vc and generates an output that drives the gates of transistors 12E, D. The source/drains of transistors 12A, 12B, 12C, 12D, 12E are coupled to positive voltage supply rail 8. Diode 14 has an anode that is directly coupled between the drain/source of transistor 12A and the negative voltage supply rail 9. Voltage Va is generated at node N1 connecting transistor 12A to the anode of diode 14. Resistor 16 is connected between the drain/source of transistor 12B and the anodes of each diode in the array 17A-17N. The cathodes of each diode in the array 17A-17N are grounded. Voltage Vb is generated at node N2 connecting resistor 16 to transistor 12B. Resistor 19 is coupled between the drain/source of transistor 12C and the negative voltage supply rail 9. The connection between resistor 19 and transistor 12C defines node N3. Node N3 is also coupled to the drain/source of transistor 12D, and the reference voltage is measured at node N3.

The drain/source of transistor 12E is coupled to resistor 20 which is connected to the negative voltage supply rail 9. Node N4 is disposed between transistor 12E and resistor 20, and generates the voltage Vc which is fed back to amplifier 11B. Va and Vc are the inputs of the control loop that includes amplifier 11B.

FIG. 5C is an electrical schematic of another conventional bandgap reference voltage generator circuit from U.S. Pat. No. 6,501,256B1 to Jaussi et al. which shows a bandgap voltage reference circuit 1200 that simultaneously generates two reference voltages. VREF is generated relative to the negative voltage supply because current I3 passes through resistor 170 which is connected to the negative voltage supply. The bias voltage on node 132 produced by differential amplifier 130 is used to bias current source transistor 1210, which in turn produces current 1212 (I4). I4 is mirrored through the action of transistors 1214 and 1216 to produce current 1222 (I5). Current I5 passes through resistor 1218 to produce VREF2 relative to the positive voltage rail.

Accordingly, there is a need for thermal sensing methods and apparatus that implement bandgap reference voltage generator that can operate at a fixed operating point and that do not require elaborate fuse trimming or programming to calibrate the bandgap voltage reference generator. There is also a need for methods and apparatuses that can provide multiple reference voltages without unnecessarily consuming valuable chip layout space. It would also be desirable to thermal sensing circuitry that can eliminate the need for a separate thermal sensing element.

SUMMARY

Methods, systems and thermal sensing apparatuses are provided that use bandgap voltage reference generators that do not use trimming circuitry. Further, circuits, systems, and methods in accordance with the present invention are provided that do not use large amounts of chip real estate and do not require a separate thermal sensing element.

BRIEF DESCRIPTION OF DRAWINGS

The following discussion may be best understood with reference to the various views of the drawings, described in summary below, which form a part of this disclosure.

DETAILED DESCRIPTION

Figure 1:
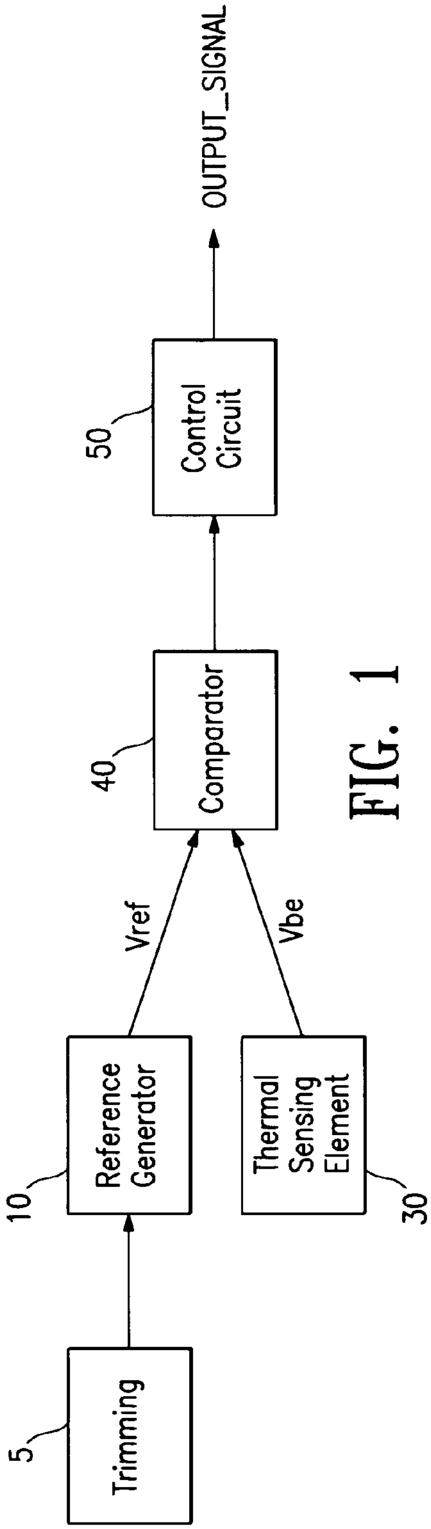
FIG. 1 is a block diagram of a conventional thermal sensing circuit.
Figure 2B:
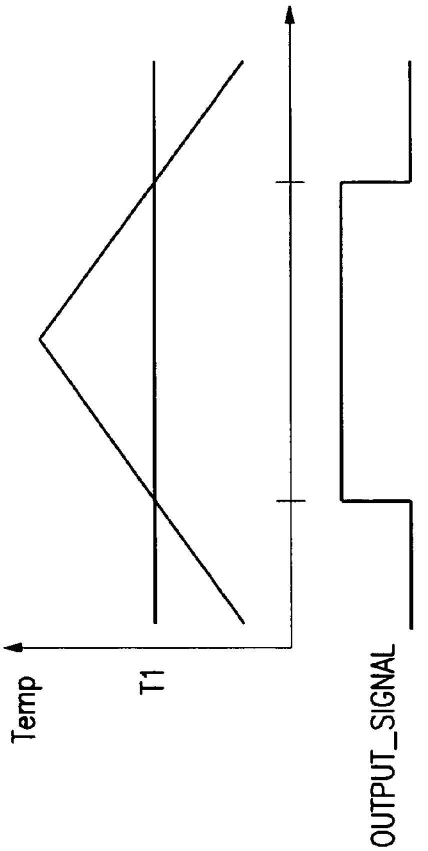
FIG. 2B is a timing diagram that shows the relationship between timing of an indicator signal generated by the thermal sensing circuit of FIG. 1 and temperature.
Figure 2A:
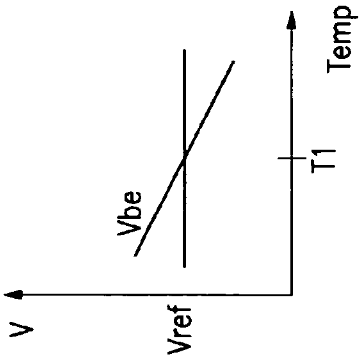
FIG. 2A is a graph of bandgap reference voltage and base-to-emitter voltage as a function of temperature.
Figure 4:
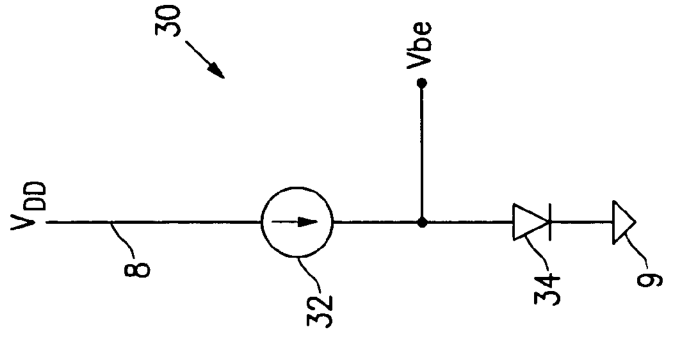
FIG. 4 is an electrical schematic of a conventional thermal sensing element circuit.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled. Like numbers refer to like elements throughout.

As used herein, the term "indicator signal" refers to a signal that is generated by when a temperature threshold is exceeded.

Aspects of the present invention can provide bandgap reference circuits that can generate a desired thermal threshold without the need for calibration circuitry. In other embodiments, the bandgap reference generator can simultaneously generate a plurality of reference voltages that are associated with a plurality of thermal thresholds. In still other embodiments, a noise filter is utilized to prevent unnecessary switching in response to noise.

Figure 6A:
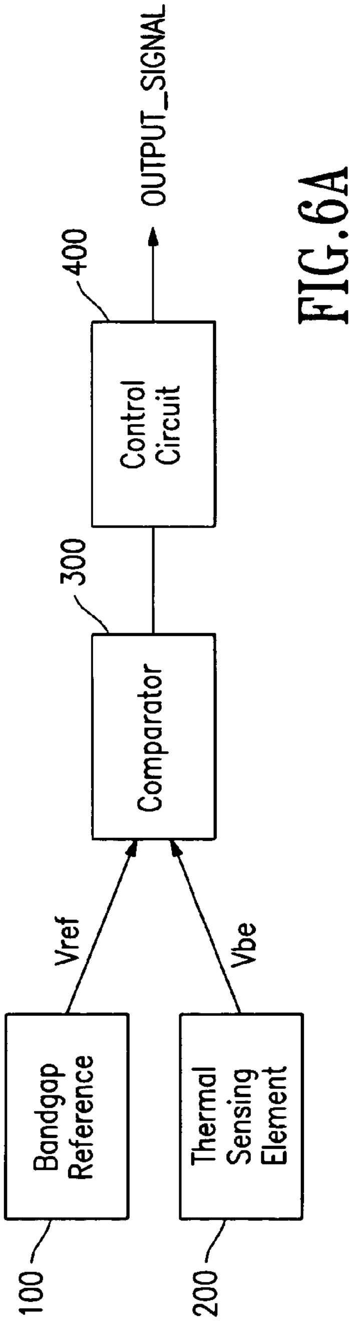
FIG. 6A is a block diagram of an embodiment of a thermal sensing circuit.

FIG. 6A is a block diagram of an embodiment of a thermal sensing circuit. The thermal sensing circuit includes a bandgap reference circuit 100, a thermal sensing element 200, a comparator 300, and a control circuit 400. The bandgap reference circuit generates a bandgap reference voltage, and the thermal sensing element generates a base-to-emitter voltage Vbe. The bandgap reference voltage and the base-to-emitter voltage Vbe are input to comparator 300. The comparator generates a comparator output OUT_COMPARATOR that is input to control circuit 400. The control circuit 400 generates an indicator signal OUTPUT_SIGNAL.

When the temperature of the substrate exceeds the thermal threshold T1, the control circuit 400 generates an indicator signal OUTPUT_SIGNAL. The thermal threshold T1 can be changed simply by adjusting the reference voltage.

Figure 6B:
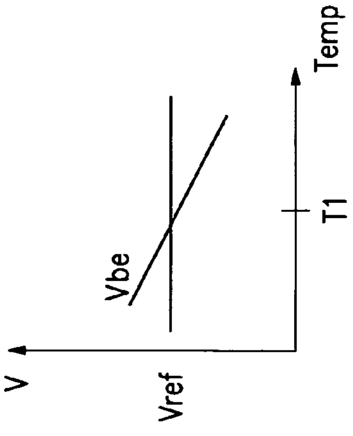
FIG. 6B is a graph of bandgap reference voltage and base-to-emitter voltage as a function of temperature.

FIG. 6B is a graph of bandgap reference voltage and box-to-emitter voltage as a function of temperature. As shown in FIG. 6B, the thermal threshold T1 is determined by the intersection of the bandgap reference voltage and the base-to-emitter voltage Vbe. Accordingly, the temperature threshold T1 can be increased by lowering the reference voltage or can be decreased by increasing the reference voltage.

Figure 6C:
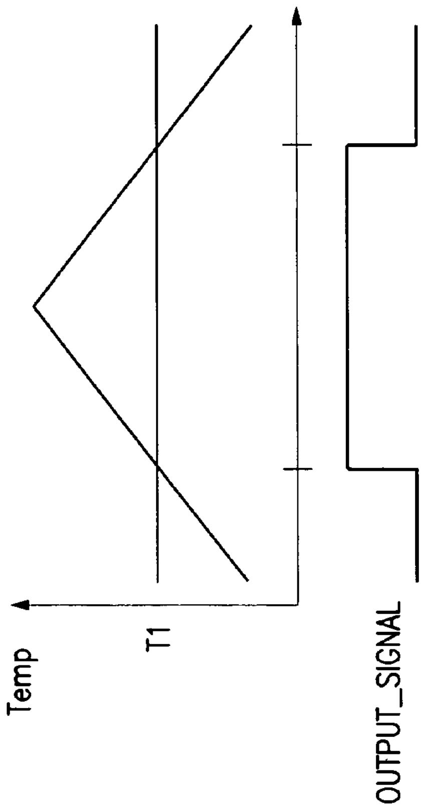
FIG. 6C is a timing diagram that shows the relationship between timing of an indicator signal generated by the thermal sensing circuit of FIG. 6A and temperature.

FIG. 6C is a timing diagram that shows the relationship between timing of an indicator signal generated by the thermal sensing circuit of FIG. 6A and temperature. As shown in FIG. 6C, the temperature threshold T1 is significant, since the intersection of the temperature threshold line with the measured temperature plot (shown as a triangle shaped signal) determines the points at which the indicator signal OUTPUT_SIGNAL will transition from a low level to a high level and from a high level to a low level. The indicator signal OUTPUT_SIGNAL transitions from a low level to a high level when the measured temperature plot (shown as a triangle shaped signal) has a positive slope (i.e., increasing temperature) above temperature threshold T1 and transitions from a high level to a low level when the measured temperature plot has a negative slope (i.e., decreasing temperature) below temperature threshold T2.

In some embodiments, it is desirable to provide two different threshold voltages so that an indicator signal OUTPUT_SIGNAL having a hysteresis characteristic can be generated. In other cases, it is desirable to have or provide two different indicator signals.

Figure 7A:
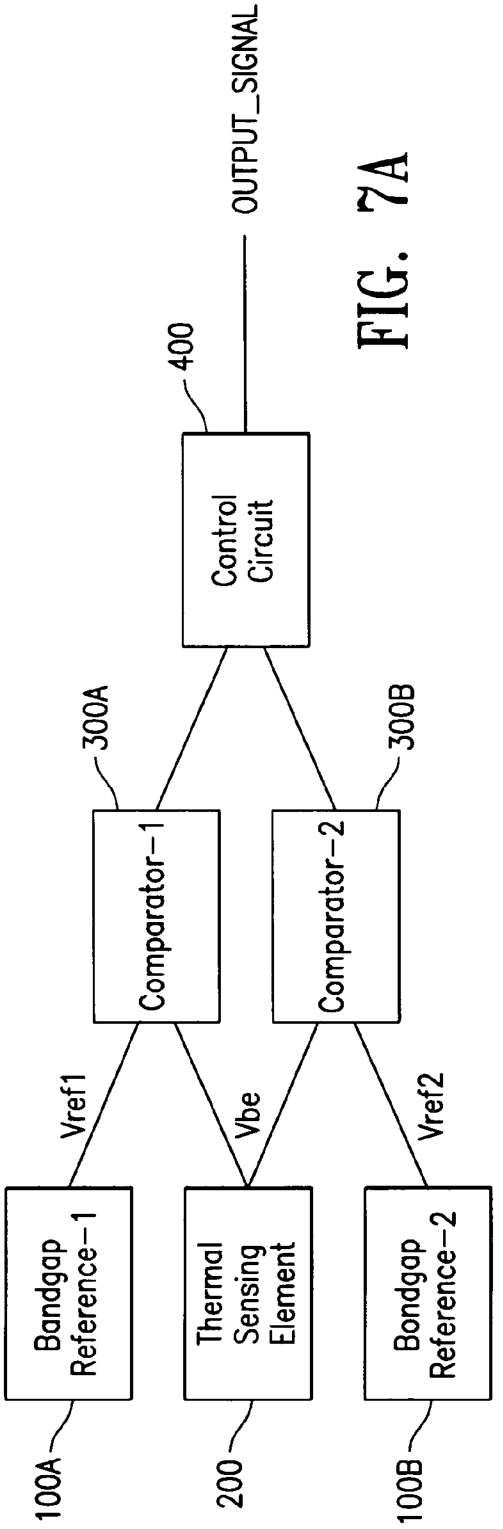
FIG. 7A is a block diagram of an embodiment of a thermal sensing circuit that includes two bandgap reference circuits that provide a first bandgap reference voltage and a second bandgap reference voltage.

FIG. 7A is a block diagram of an embodiment of a thermal sensing circuit that includes two bandgap reference circuits that provide a first bandgap reference voltage and a second bandgap reference voltage.

As shown in FIG. 7A, the thermal sensing circuit includes first and second bandgap reference circuits 100A, 100B, a thermal sensing element 200, first and second comparators 300A, 300B and control circuit 400. The bandgap reference circuit 100A generates a first bandgap reference voltage Vref1 that corresponds to a first thermal threshold T1. The second bandgap reference generator circuit 100B generates a second bandgap reference voltage Vref2 that corresponds to a second thermal threshold T2. The bandgap reference circuits 100A, 100B thus provide a first bandgap reference voltage Vref1 and a second bandgap reference voltage Vref2 that is different from the first bandgap reference voltage Vref1.

Figure 7B:
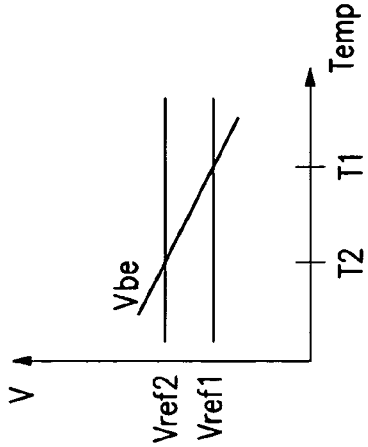
FIG. 7B is a graph of first and second bandgap reference voltages and base-to-emitter voltage as a function of temperature.

A thermal sensing element generates a base-to-emitter voltage Vbe signal that is input into both the first and second comparators 300A and 300B. FIG. 7B is a graph of first and second bandgap reference voltages and base-to-emitter voltage and a function of temperature. As illustrated in FIG. 7B, the first and second bandgap reference voltages intersect the base-to-emitter voltage Vbe line at different locations. The intersection of the first bandgap reference voltage Vref1 line and the base-to-emitter voltage Vbe determines the first temperature threshold T1, whereas the intersection between the second bandgap reference voltage Vref2 line and the base-to-emitter voltage Vbe line determines the second temperature threshold T2. Since the first bandgap reference voltage Vref1 and second bandgap reference voltage Vref2 are fixed, the first and second temperature thresholds at particular base-to-emitter voltages which correspond to certain temperatures.

The first comparator 300A compares the first bandgap reference voltage Vref1 to the base-to-emitter voltage Vbe and generates a first comparator output OUT_COMPARATOR. The second comparator 300B compares the second bandgap reference voltage Vref2 to the base-to-emitter voltage Vbe, and generates a second comparator output OUT_COMPARATOR. The respective comparator output OUT_COMPARATORs are then input in the control circuit 400.

Figure 7C:
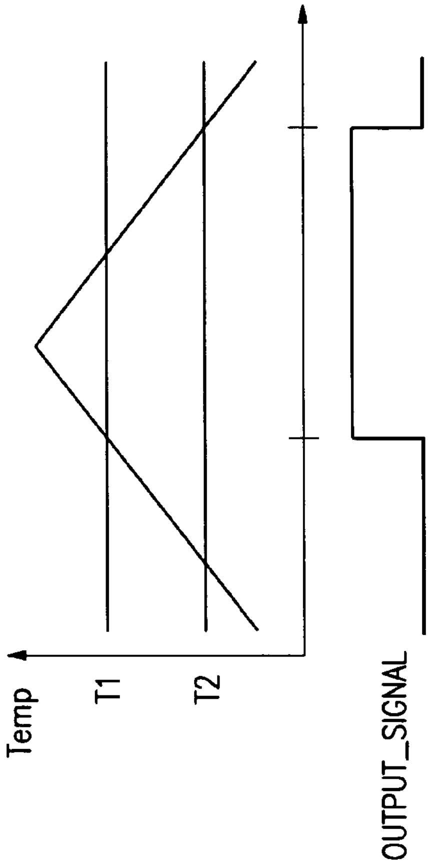
FIG. 7C is a timing diagram showing the relationship between timing of an indicator signal generated by the thermal sensing circuit of FIG. 7A and temperature.

FIG. 7C is a timing diagram showing the relationship between the timing of an indicator signal generated by the thermal sensing circuit of FIG. 7A and temperature. The graph includes lines corresponding to the first and second temperature thresholds and a measured temperature plot (shown as a triangle shaped signal). The control circuit utilizes the comparator outputs OUT_COMPARATOR to generate an indicator signal OUTPUT_SIGNAL as shown in FIG. 7C. The indicator signal OUTPUT_SIGNAL transitions from low to high when the measured temperature plot (shown as a triangle shaped signal) is increasing and the temperature exceeds the first temperature threshold line T1. The indicator signal OUTPUT_SIGNAL transitions from high to low when the measured temperature plot is decreasing and the temperature falls below the second temperature threshold line T2.

The thermal sensing circuit illustrated in FIG. 7A uses multiple comparators and multiple bandgap reference generator circuits which consumes valuable layout space. Embodiments of the present invention provide bandgap reference circuits that can generate a plurality of different bandgap reference voltages, without consuming a significant amount of extra layout space.

Figure 8:
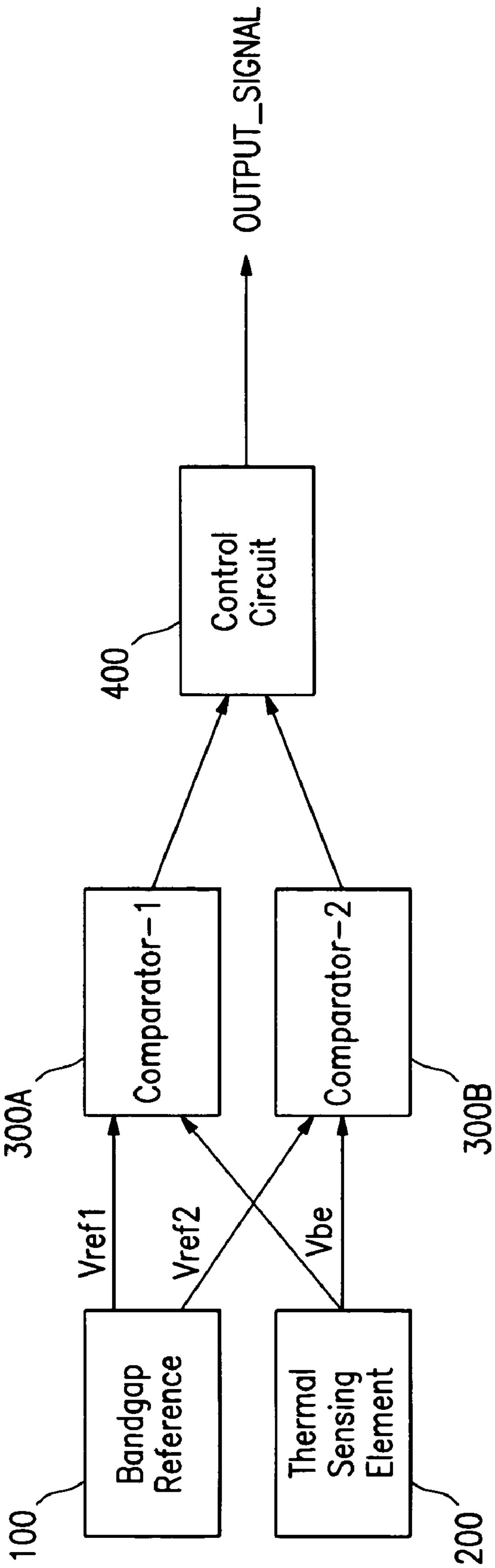
FIG. 8 is a block diagram of an embodiment of a thermal sensing circuit.

FIG. 8 is a block diagram of an embodiment of a thermal sensing circuit that includes a bandgap reference generator circuit 100, a thermal sensing element 200, a comparator 300A and a second comparator 300B and a control circuit 400 are provided.

The bandgap reference generator circuit generates the first and second bandgap reference voltages Vref1, Vref2. Thermal sensing element 200 generates the base-to-emitter voltage Vbe and provides the base-to-emitter voltage Vbe to both the first and second comparators 300A, 300B. The bandgap reference circuit provides the first bandgap reference voltage Vref1 to the first comparator 300A and provides the second bandgap reference voltage Vref2 to the second comparator 300B.

The first comparator 300A generates a comparator output OUT_COMPARATOR1 that is received by control circuit 400. The second comparator 300B generates another comparator output OUT_COMPARATOR2 that is also sent to the control circuit 400. The control circuit 400 utilizes the respective comparator outputs to generate an indicator signal OUTPUT_SIGNAL. In this case, the second bandgap reference voltage Vref2 is preferably higher than the first bandgap reference voltage Vref1. The bandgap reference generator circuit could be provided via circuits such as that shown in FIGS. 9 and 10.

Figure 9:
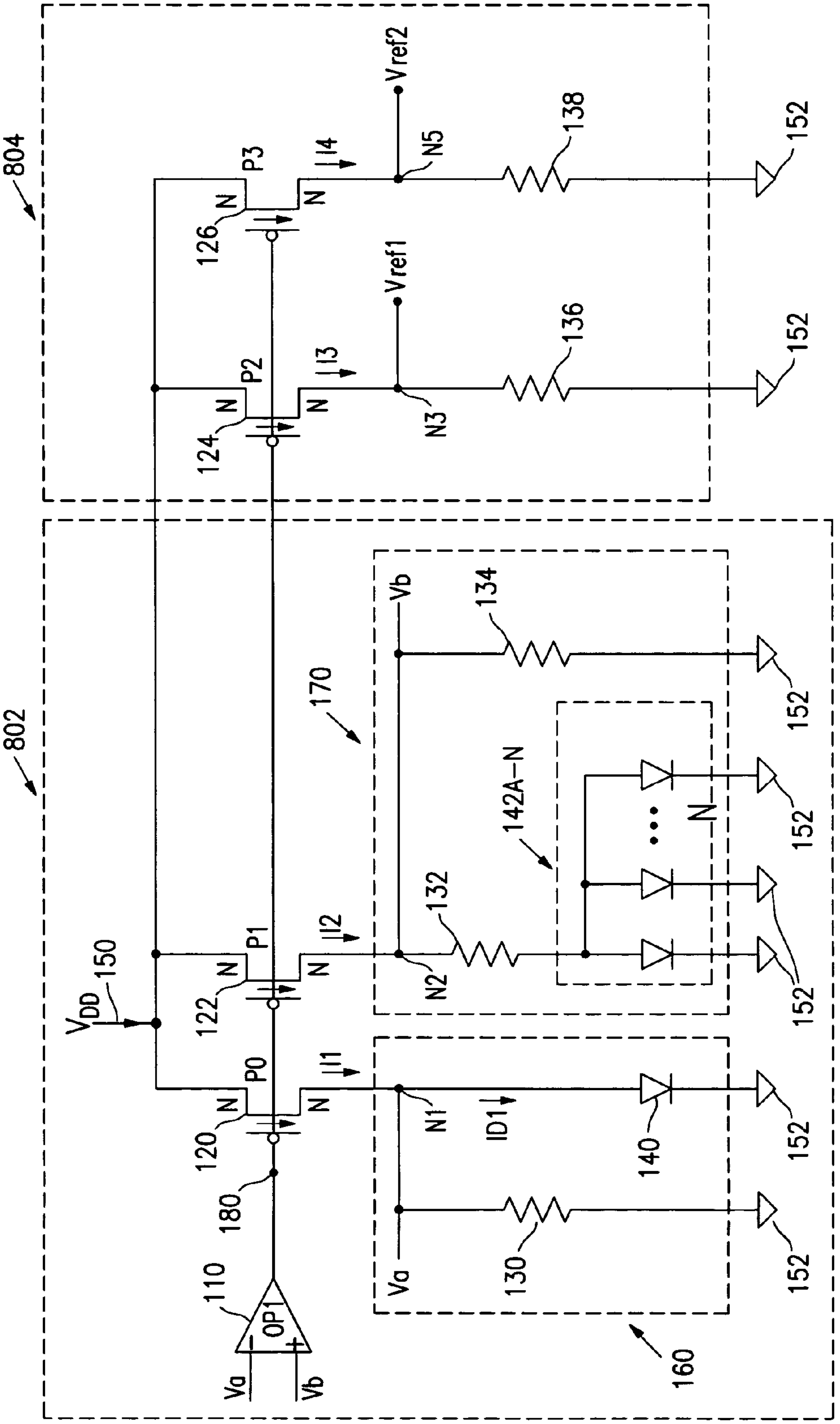
FIG. 9 is an electrical schematic of an embodiment of a bandgap reference circuit that is configured to generate two different reference voltages.

FIG. 9 is an electrical schematic of an embodiment of a bandgap reference circuit that is configured to generate two different reference voltages. The bandgap reference generator circuit includes a control loop 802 and a reference voltage generator 804. The control loop 802 includes a differential amplifier 110, parallel combination circuits 160, 170, a positive voltage supply 150, and a negative voltage supply 152. The parallel combination circuits comprise current source transistors 120, 122 and resistors 130, 132, 134, a diode 140 and a diode array 142 A-N. The reference voltage generator unit 804 includes current source transistors 124, 126 and output resistors 136 and 138.

The drain/source terminals of current source transistors 120, 122, 124, 126 are coupled to nodes N1, N2, N3, N4, respectively. The source/drain terminals of current source transistors 120, 122, 124, 126 are connected to positive voltage supply rail 150.

Input voltage Va is generated at node N1. Parallel combination circuit 160 comprises a resistor 130 in parallel with a diode 140 between the node N1 and negative voltage supply rail 152. The anode of diode 140 is connected to the node N1 and the cathode of diode 140 connected to the negative voltage supply rail 152. Diode 140 has a current shown as current ID1.

Input voltage Vb is generated at node N2 which connects the drain/source of current source transistor 122 to parallel combination circuit 170. Parallel combination circuit 170 comprises a first path and a second path in parallel with the first path. The first path includes a resistor 132 in parallel with the diode array 142A-N. The diode array 142A-N has a current flowing therethrough shown as current ID2. The anodes of each diode in the diode array are coupled to resistor 132 and the cathodes of each diode in the diode array are connected to the negative voltage supply rail 152. The second path comprises a resistor 134 disposed between node N2 and negative voltage supply rail 152. Resistor 134 is connected between the drain/source terminal of current source transistor 124 and negative voltage supply rail 152.

The diode and each diode in the diode array 142A-N are semiconductor structures that each include a PN junction. As will be appreciated, other types of semiconductor devices that include a PN junction can alternatively be used within the circuit 100. The diode array 142A-N utilizes a plurality of diodes connected in parallel to effectively provide a PN junction that has a cross-sectional area that is larger than that of the PN junction in the first diode 140. In one embodiment, for example, the second diode array 142A-N consists of N diodes connected in parallel that are each substantially the same size as the first diode 140. The diode array 142A-N may alternatively comprise a single diode having large dimensions.

Input voltages Va and Vb are generated at nodes N1 and N2, respectively, and fedback as inputs to the amplifier 110 via respective feedback paths. Va is the voltage developed across parallel combination circuit 160 by current I1, and Vb is the voltage developed across parallel combination circuit 170 as a result of current I2.

Input voltages Va and Vb drive the amplifier 110 to generate a bias voltage on node 180. Differential amplifier 110 thus produces the bias voltage as a function of the two input voltages, Va and Vb. Because the gate of current source transistor 120 is coupled to the gate of current source transistor 122 which is coupled to the gate of current source transistor 124 which is coupled to the gate of current source transistor 126, the bias voltage on node 180 that biases current source transistors 120, 122, 124, 126.

As a result, current source transistor 120 sources current I1 to parallel combination circuit 160, current source transistor 122 sources current I2 to parallel combination circuit 170, current source transistor 124 sources current I3 to output resistor 136, and current source transistor 126 sources current to resistor 138.

In embodiments shown here in the current source transistors are P-channel metal oxide semiconductor field effect transistors (PMOSFETs), also referred to as "PFETs." However, other embodiments utilize the complementary conductivity type N-channel metal oxide semiconductor field effect transistors (NMOSFETs), also referred to as "NFETs." Other embodiments can also be provided that utilize other types of transistors, such as bipolar junction transistors (BJTs) and junction field effect transistors (JFETs). One of ordinary skill in the art will understand that many other types of transistors can be utilized without departing from the scope of the present invention.

A control loop 802 is formed by the operation of differential amplifier 110, current source transistors 120 and 122, and parallel combination circuits 160 and 170. Differential amplifier 110 adjusts the bias voltage controlling current source transistors 120 and 122 to drive the difference between Va and Vb to near zero. As a result, in operation, the voltages developed across parallel combination circuits 160 and 170 are substantially equal. In the embodiments discussed herein, currents I1 and I2 are also substantially equal in part because current source transistors 120 and 122 receive the same bias voltage.

Differential amplifier 110 is preferably a high gain amplifier. Because gain tends to fluctuate as a function of common-mode voltage that is input into the differential amplifier 110, the input voltages should be designed such that the "operating point" of the differential amplifier is maintained in a region of high gain since the bandgap reference voltages Vref1, Vref2 will be more stable and thus less sensitive to temperature variations. The gain of differential amplifier 110 is typically highest when operated with input voltages within a specified common-mode input voltage range. Because the resistance value of the resistors are fixed, voltages Va and Vb remain relatively fixed such that the input voltage levels to differential amplifier 110 tend to be constant at steady-state. Components of the bandgap voltage reference generator circuit are thus selected such that the input voltage levels to differential amplifier 110 stay within a range that provides very high gain.

The voltage reference generator unit 804 includes current source transistors 124, 126. The current source transistor 124 provides current I3 to ouput resistor 136 to generate the first reference voltage Vref1 at node N3 between resistor 136 and the drain/source terminal with current source transistor 124.

The second bandgap reference voltage Vref2 is generated at node N4 provided between the drain/source terminal of current source transistor 126 which provides current I4 and output resistor 138. Resistor 138 is connected between node N4 and negative voltage supply rail 152. At steady-state, currents I3 and I4 are fixed to provide fixed reference voltages Vref1 and Vref2, respectively. The current source transistor 126 and resistor 138 allow a second bandgap reference voltage Vref2 to be generated. The first bandgap reference voltage Vref1 is proportional to the ratio of resistor 136 and resistor 130, while the second bandgap reference voltage Vref2 is proportional to the ratio of the resistor 138 and the resistor 130. Both the reference voltages are generated relative to the negative voltage rail 152.

Figure 10:
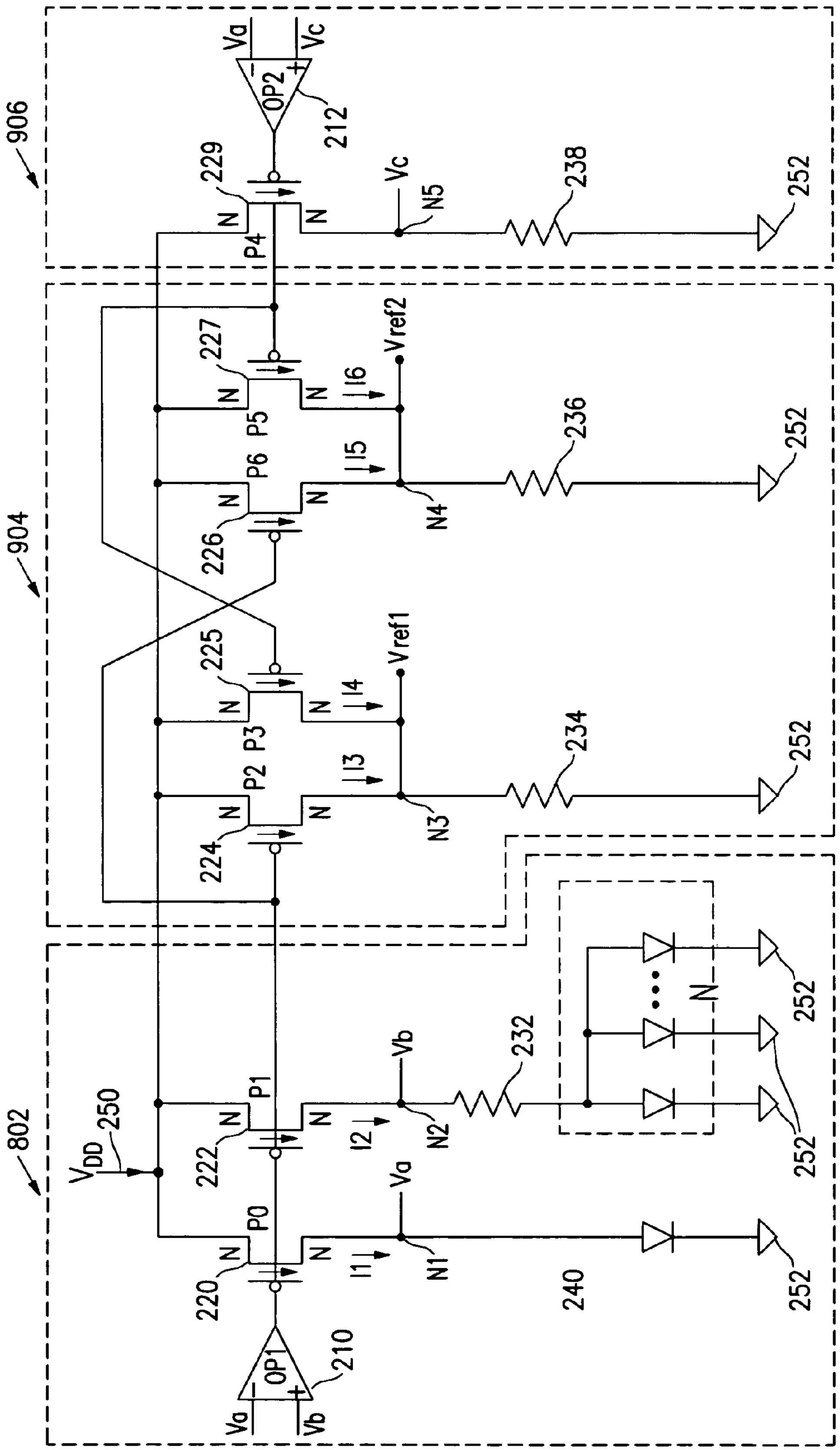
FIG. 10 is an electrical schematic of another embodiment of a bandgap reference generator circuit that is configured to generate two different reference voltages.

FIG. 10 is an electrical schematic of another embodiment of a bandgap reference generator circuit that is configured to generate two different reference voltages. The bandgap reference generator circuit comprises a first control loop 802, a reference voltage generator unit 904, and a second control loop 906. The first control loop includes a first differential amplifier 210, current source transistors 220, 222, a resistor 232, a diode 240, a diode array 242 A-N, a positive supply voltage 250, and a negative supply voltage 252. The reference voltage generator unit 904 includes current source transistors 224, 225, 226, 227, and resistors 234, 236 connected to a negative voltage supply 252.

The second control loop 906 includes a second differential amplifier 212, a current source transistor 229, and a resistor 238 connected to negative voltage supply 252. The source/drain of current source transistors 220, 222, 224, 225, 226, 227, 229 are connected to line 250.

The gate electrodes of current source transistors 220, 222, 224, 226 are driven by the output of first amplifier 210 since the gate electrode of transistor 220 is coupled to the gate of current source transistor 222, the gate of current source transistor 222 is coupled to the gate of current source transistor 224, and the gate of current source transistor 226 is coupled to the gate of current source transistor 224. Similarly, the gate electrodes of current source transistors 225, 227, 229 are biased by the output of second amplifier 212 since the gate of current source transistor 225 is coupled to the gate of current source transistor 227 and the gate of current source transistor 227, is coupled to the gate of 229.

Once biased, current source transistors 220, 222, 224, 225, 226, 227, 229 generate currents I1, I2, I3, I4, I5, I6, I7, respectively. The first amplifier 210 has inputs voltage Va and voltage Vb. The second amplifier has inputs voltage Va and voltage Vc. The first amplifier 210 generates an output that is coupled to and drives current source transistor 220. The second amplifier 212 generates an output that drives the gate of current source transistor 229. Diode 240 is provided between the drain/source of current source transistor 220 and negative voltage supply rail 252.

Node N1 connects the anode of diode 240 to the drain/source of current source transistor 220. Voltage Vc is generated at node N1 and fed back to the second amplifier 212. Node N2 connects the drain/source of current source transistor 222 to resistor 232. Voltage Vb is generated at node N2 and fed back to the first amplifier 210. Resistor 232 is also connected to each of the anodes in the diode array 242A-N. The cathodes of each of the diodes in diode array 242A-N are connected to negative voltage supply rail 152.

Resistor 234 is connected between the drain/source of current source transistor 224 and negative voltage supply rail 152 with node N3 defining the connection between resistor 234 and current source transistor 224. Node N3 is connected to node N4, which is provided at the drain/source of current source transistor 225. The first bandgap reference voltage Vref1 is generated at node N4.

Similarly, resistor 236 is connected to the drain/source terminal of current source transistor 226 at node N5. The resistor 236 is coupled between node N5 and negative voltage supply rail 152. Node N5 is coupled to node N6 at which the second bandgap reference voltage Vref2 is generated.

Node N6 connects at the drain/source terminal current source transistor 227 to resistor 238 which is connected between node N6 and the negative voltage supply rail 152. Node N6 is also connected to the drain/source terminal current source transistor 229.

Figure 11:
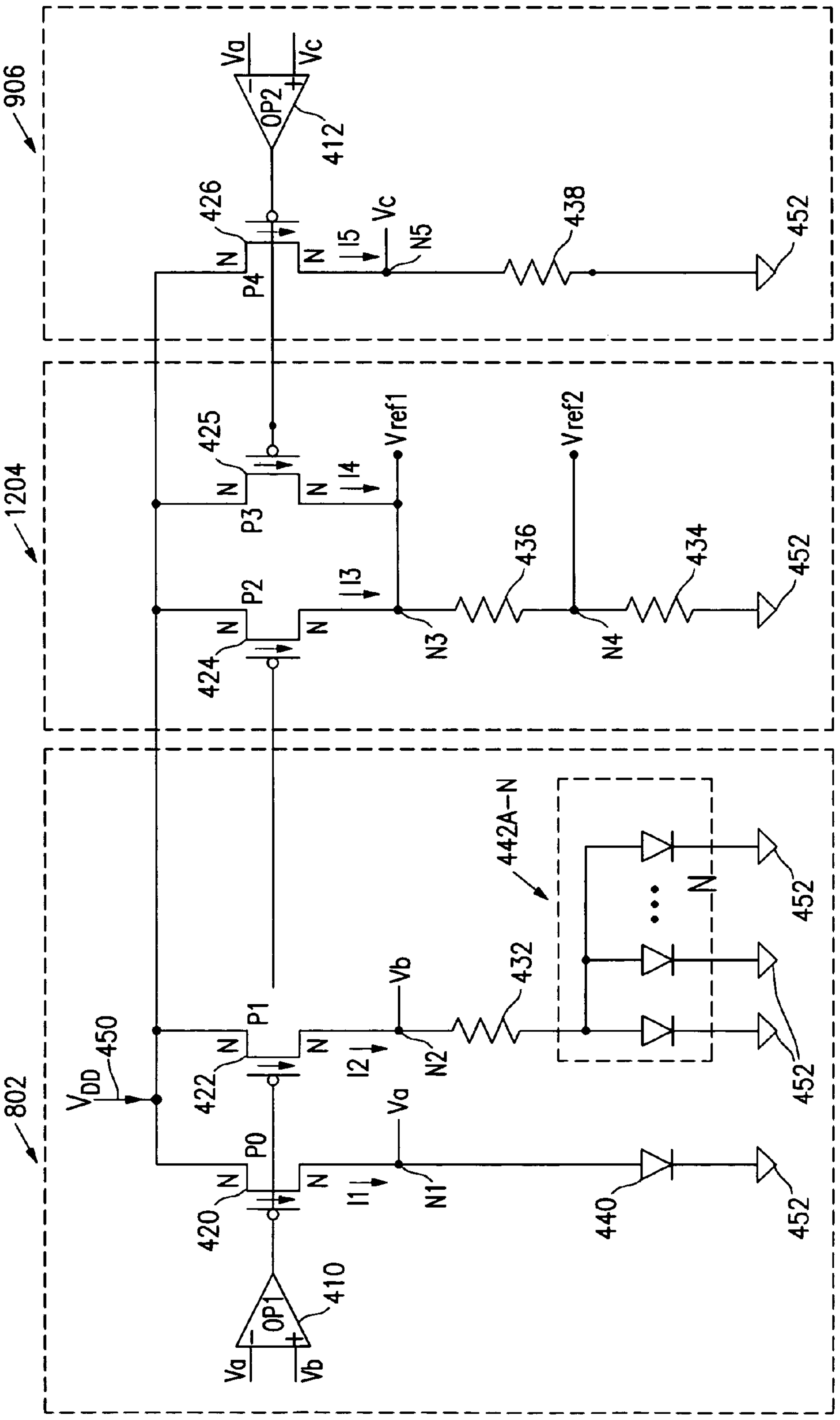
FIG. 11 is an electrical schematic of another embodiment of a bandgap reference generator circuit having two control loops and that is configured to generate two different reference voltages.

FIG. 11 is an electrical schematic of another embodiment of a bandgap reference generator circuit having two control loops and that is configured to generate two different reference voltages. As shown in FIG. 11, the bandgap reference generator circuit includes a control loop 802, and a reference voltage generator unit 1204 and a second control loop 906. The first control loop 802 includes an amplifier 410, current source transistors 420, 422, resistor 432, a diode 440 and a diode array 442A-N. The generator unit 1204 includes current source transistors 424, 425, and resistors 434, 436. The second control loop 906 includes current source transistor 426, resistor 438 and a second amplifier 412.

Amplifier 410 includes inputs voltage Va and voltage Vb which are fed back from nodes N1 and N2, respectively, while amplifier 412 includes inputs voltage Va and voltage Vc, which are fed back from nodes N1 and N5, respectively. In addition, voltage Va is identical to voltage Vb when the embodiment in FIG. 11 is implemented. Amplifier 410 generates an output signal that drives the gates of current source transistors 420, 422, 424 while amplifier 412 generates an output signal that drives the gates of current source transistors 425, 426. The gate of current source transistor 420 is coupled to the gate of current source transistor 422 which is coupled to the gate of current source transistor 424. The gate of current source transistor 425 is coupled to the gate of current source transistor 426. The source/drain terminals of current source transistors 420, 422, 424, 425, 426 are coupled to signal line 450. Diode 440 is connected between a first node provided at the drain/source terminal of current source transistor 420 and negative voltage supply rail 152. The voltage Va is generated at the first node by a current I1 from transistor 420.

A resistor 432 is provided between node N2 and the diode array 442A-N. Voltage Vb is generated at node N2 by a current I2 from transistor 422. Resistor 432 is connected to the anodes of each diode in Array 442A-N, while the cathodes of each diode in Array 442A-N are coupled to negative voltage supply rail 152.

Resistor 436 is provided between node N3 and node N4. Node N3 is located at the drain/source of current source transistor 424 and the drain/source of current source transistor 425. The second bandgap reference voltage Vref2 is generated at node N3 by currents I3, I4 flowing from transistors 424, 425. Resistor 434 is provided between node N4 and negative voltage supply rail 452. The first bandgap reference voltage Vref1 is generated at node N4 by currents I3/I4 from transistors 424, 425. It should be noted that transistors 424, 425 are biased and thus controlled by outputs of amplifiers 410, 412, respectively.

Resistor 438 is provided between node N5 and negative voltage supply rail 452. Node N5 is provided at the drain/source terminal of current source transistor 426 and generates the voltage Vc.

Figure 12:
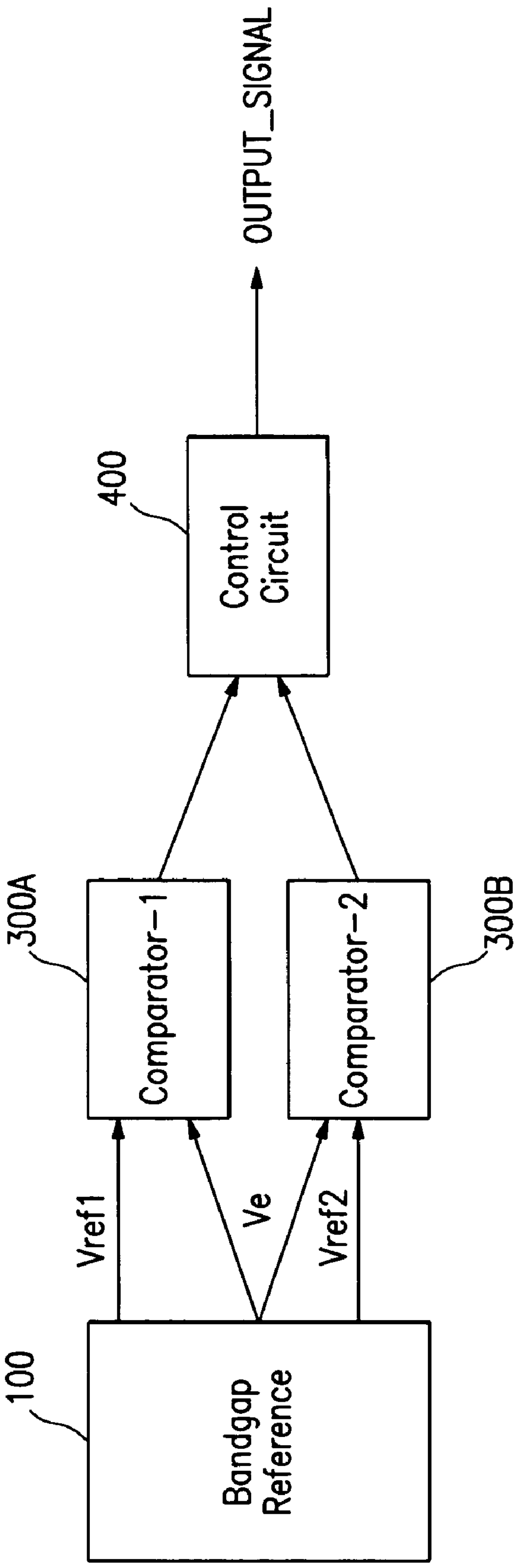
FIG. 12 is block diagram of another embodiment of a thermal sensing circuit that includes a single bandgap reference generator circuit, first and second comparators, and a control circuit.

FIG. 12 is block diagram of another embodiment of a thermal sensing circuit that includes a single bandgap reference generator circuit 100, first and second comparators 300A, 300B and a control circuit 400. The bandgap reference generator circuit 100 generates a first bandgap reference voltage Vref1, a second bandgap reference voltage Vref2, and voltage Va. In this case, voltage Va has a temperature coefficient corresponding to the base-to-emitter voltage Vbe of diode 440. This can eliminate the need for a separate thermal sensing element.

Comparator 300A is responsive to the first bandgap reference voltage Vref1 and voltage Va. The first comparator 300A generates a first comparator output OUT_COMPARATOR that is sent to control circuit 400. The second comparator 300B is responsive to voltage Va and the second bandgap reference voltage Vref2. The second comparator 300B generates a second comparator output OUT_COMPARATOR that is provided to the control circuit 400. Control circuit 400 utilizes the first and second comparator output OUT_COMPARATORs to generate an indicator signal OUTPUT_SIGNAL.

As a result, voltage Va can be used instead of the base-to-emitter voltage Vbe, which greatly simplifies the thermal sensing circuit. This is because the thermal sensing circuit provides both first bandgap reference voltage Vref1 and second bandgap reference voltage Vref2 as well as the voltage Va, which includes information regarding a temperature coefficient. As a result, the layout area required for the thermal sensing circuit is substantially reduced. In the embodiment shown in FIG. 11, moreover, the voltage Va can be made equivalent to voltage B, since multiple amplifiers are used.

Figure 13:
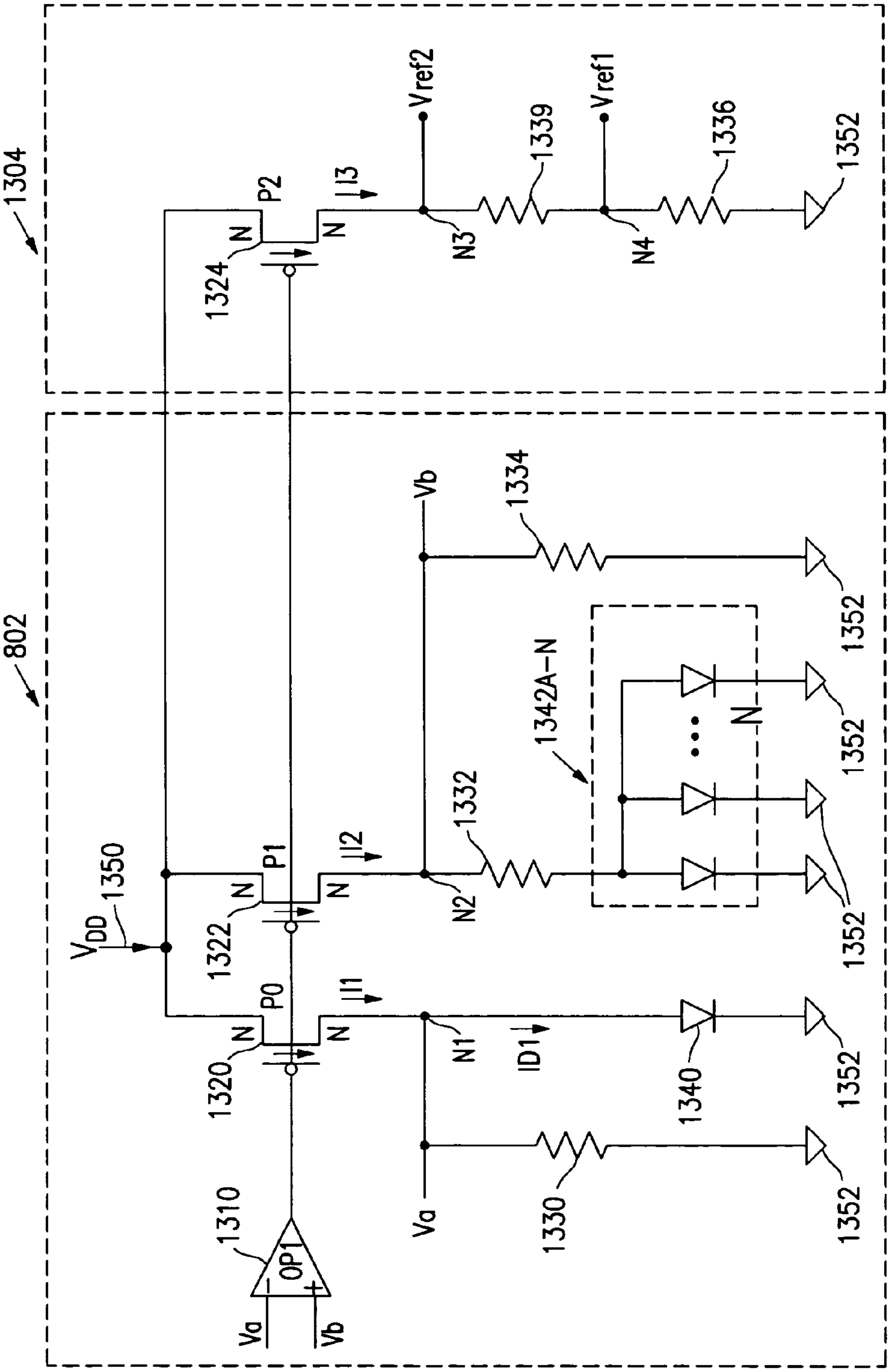
FIG. 13 is an electrical schematic of another embodiment of a bandgap reference generator circuit having a control loop and that is configured to generate two different reference voltages.

FIG. 13 is an electrical schematic of another embodiment of a bandgap reference generator circuit having a control loop 802 and reference voltage generator 1304. The generator circuit is configured to generate two different reference voltages.

Control loop 802 includes an amplifier 1310, current source transistors 1320, 1322, resistors 1330, 1332, 1334, a diode 1340, a diode array 1342A-N and a positive voltage supply 350. The source/drain terminal of current source transistors 1320, 1322, 1324 are coupled to positive voltage supply 1350. The gate of current source transistor 1320 is coupled to the gate of current source transistor 1322, which is coupled to the gate of current source transistor 1324. Voltage Va and Voltage Vb serve as control signals that are fed back as inputs into the amplifier 310. Amplifier 310 generates an output signal that biases the gates of current source transistors 1320, 1322, 1324. Current source transistors 1320, 1322, 1324 generate currents I1, I2, I3, respectively.

Voltage Va is generated at node N1. The drain/source terminal of current source transistor 1320 is coupled to resistor 1330 at node N1. Resistor 1330 is disposed between voltage Va and negative voltage supply rail 1352. Diode 1340 also is coupled between node N1 and negative voltage supply rail 1352.

Voltage Vb is generated at node N2 which is provided at the drain/source terminal of current source transistor 1322. Resistor 1332 is coupled between node N2 and Diode Array 1342A-N. The diode array is coupled to the negative voltage supply rail 1352.

Resistor 1334 is coupled between node N2 and negative voltage supply rail 1352 such that voltage equal to the difference between voltage Vb and the negative supply voltage 1352, developed across resistor 1334.

The resistor 1332 is coupled between node N1 and the anodes of each of the diodes in array 1342A-N. The cathodes of each diode in array 1342A-N are coupled to negative voltage supply rail 1352.

The reference voltage generator 1304 includes current pass transistor 1324, and resistors 1336, 1339 which serve to divide the voltage generated between node N3 and the negative voltage supply 1352. The second bandgap reference voltage Vref2 is generated relative to the negative voltage supply rail 1352 at node N3 which is disposed between the drain/source terminal of current source transistor 1324 and a terminal of resistor 1339 such that a voltage equal to the difference between Vref2 and Vref1 is developed across resistor 1339. The other terminal of resistor 1339 is coupled to node N4 at which the first bandgap reference voltage Vref1 is generated. Resistor 1336 is connected between node N4 and negative voltage supply rail 1352.

In FIG. 13, the first bandgap reference voltage Vref1 is proportional to the ratio of resistor 1336 to resistor 1334 and the second bandgap reference voltage Vref2 is proportional to the ratio of the sum of resistors 1336 and 1339 to resistor 1334. According to these embodiments, a plurality of different reference voltages can be provided without unnecessarily consuming additional layout space.

Figure 3:
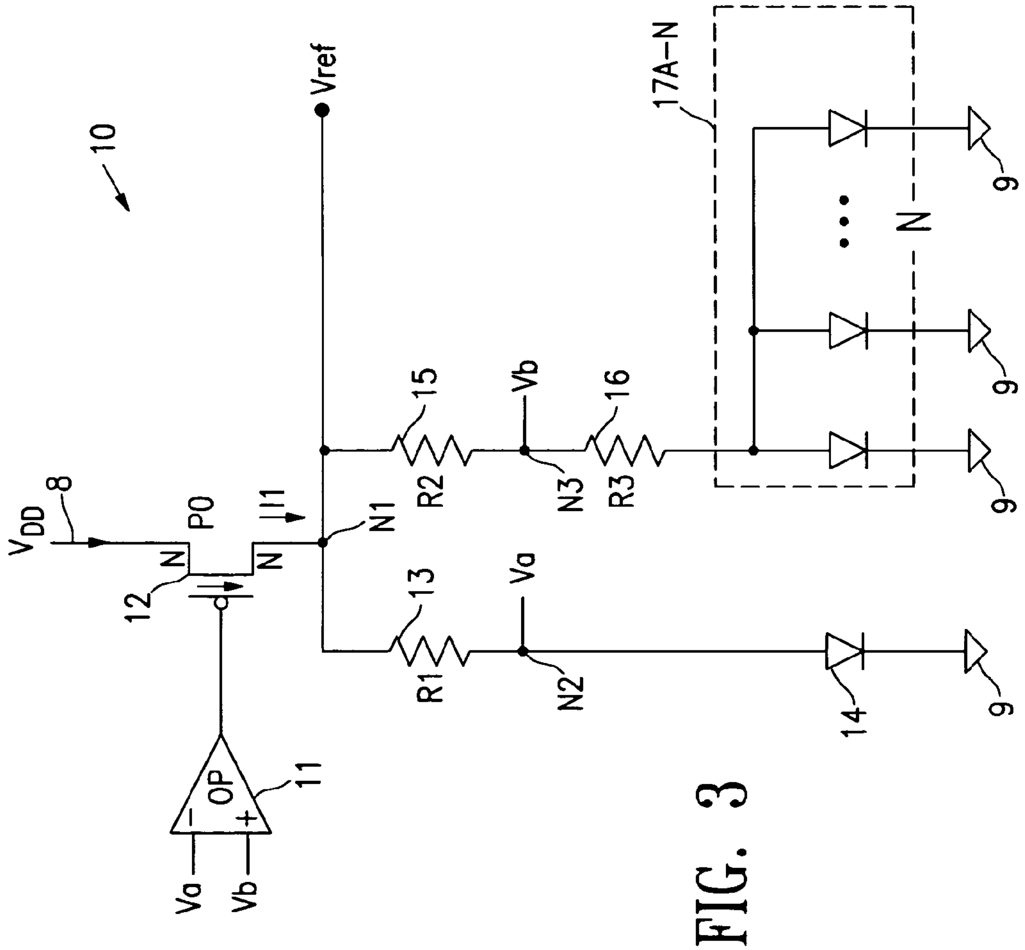
FIG. 3 illustrates a conventional bandgap reference generator circuit.
Figure 5A:
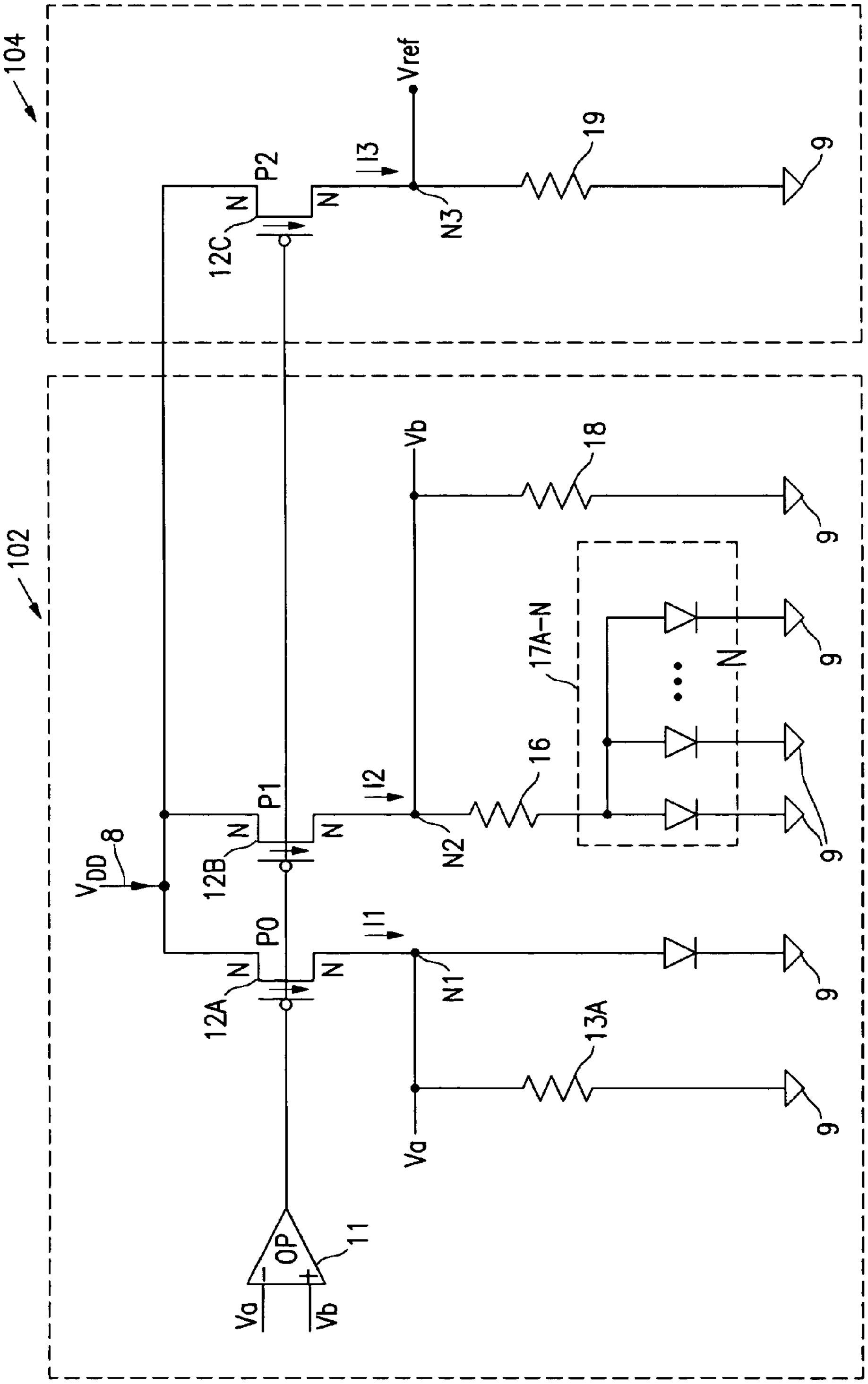
FIG. 5A is an electrical schematic of another conventional bandgap reference voltage generator circuit.
Figure 5B:
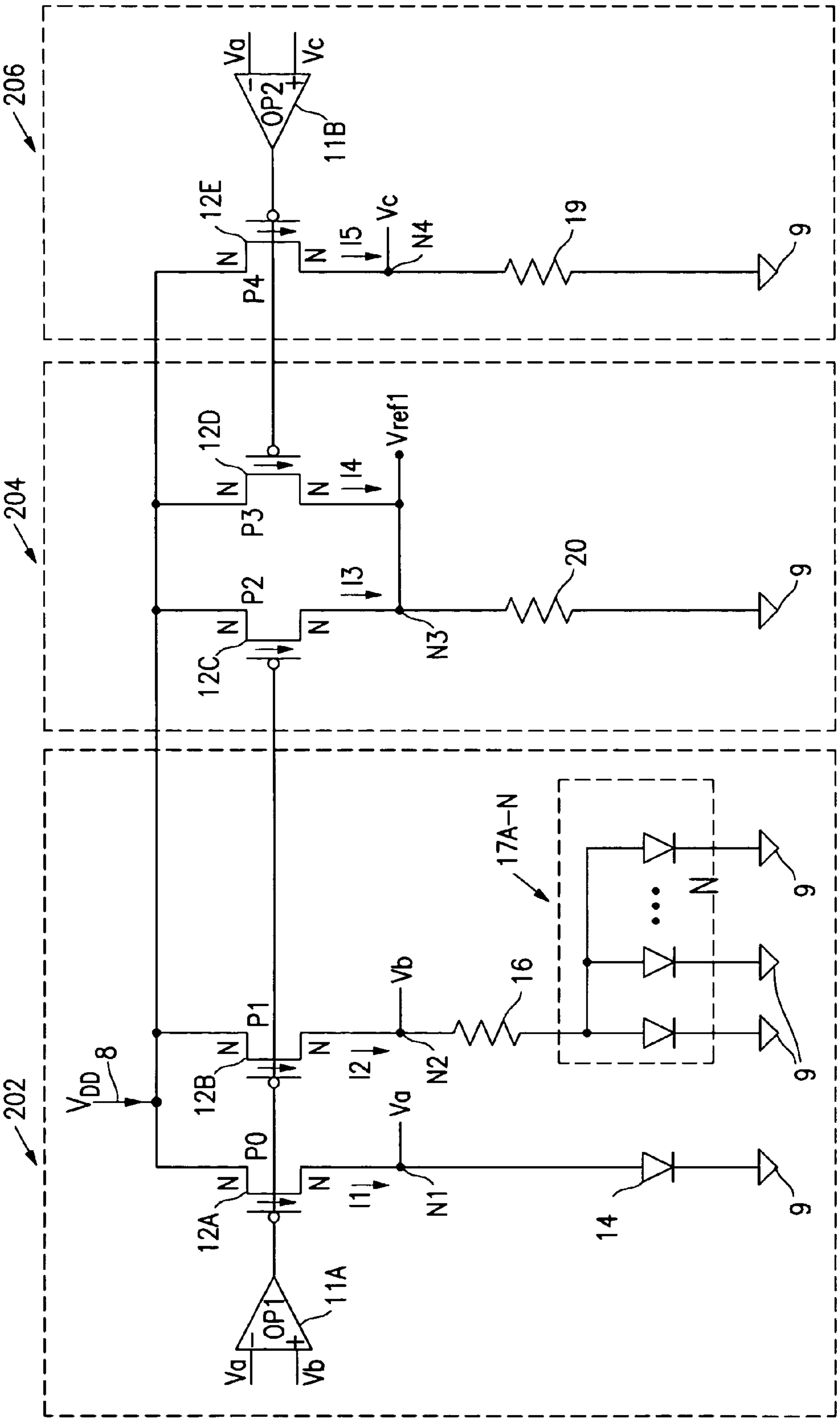
FIG. 5B is an electrical schematic of another conventional bandgap reference voltage generator circuit.
Figure 5C:
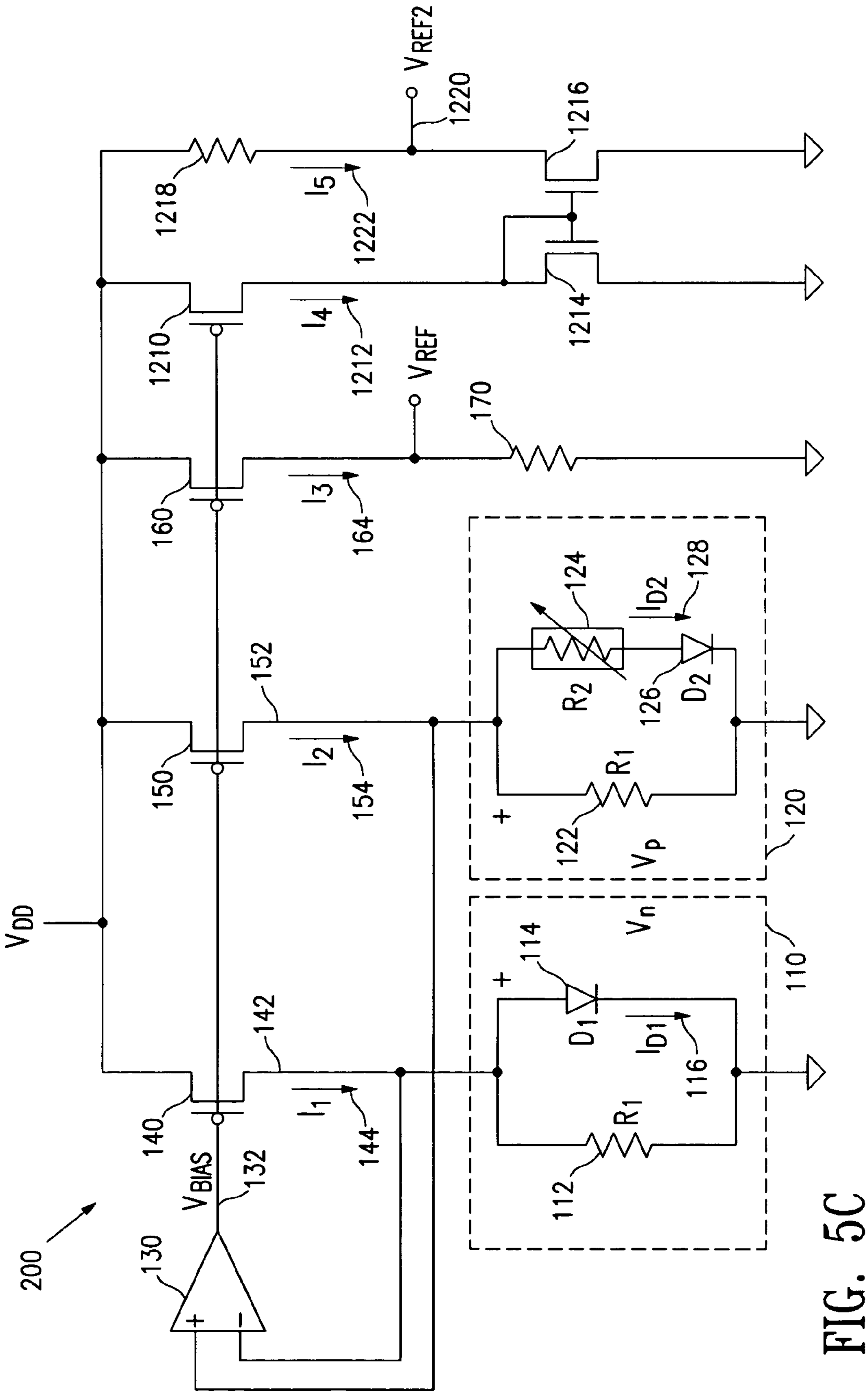
FIG. 5C is an electrical schematic of another conventional bandgap reference voltage generator circuit.

In addition, in the embodiment shown in FIG. 13, intermediate node N1 has a temperature coefficient corresponding to the base-to-emitter voltage Vbe shown in FIG. 3. Accordingly, the intermediate node N1 voltage can be used instead of the base-to-emitter voltage Vbe. Thus, a single circuit is provided that generates multiple different bandgap reference voltages in addition to a voltage equivalent to the base-to-emitter voltage Vbe that is used to supply a temperature coefficient without the need for a separate prior thermal sensing element such as shown in FIG. 3.

Figure 14:
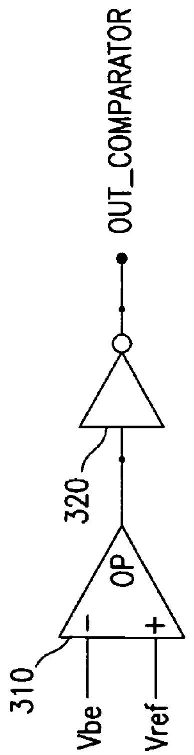
FIG. 14 is an electrical schematic of an embodiment of a comparator circuit.

FIG. 14 is an electrical schematic of an embodiment of a comparator circuit. As shown in FIG. 14, the comparator can be constructed using an amplifier 310 and an inverter 320. The amplifier 310 is responsive to inputs corresponding to the bandgap reference voltage and the base-to-emitter voltage Vbe. Those skilled in the art will appreciate that voltages other than the base-to-emitter voltage Vbe can also be utilized such as voltage Va discussed above in conjunction with FIG. 12. The amplifier 310 then generates an output signal that is input to the inverter 320. As a result, inverter 320 generates a comparator output OUT_COMPARATOR signal.

Figure 15A:
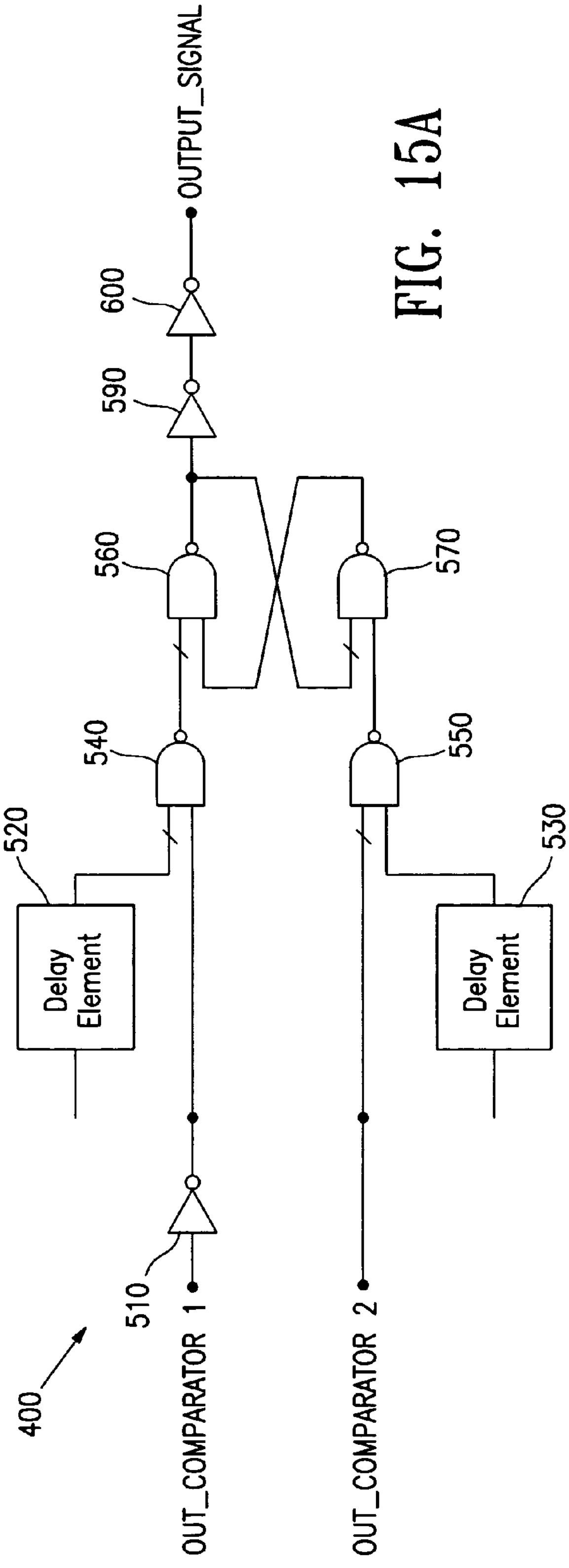
FIG. 15A is an electrical schematic of an embodiment of a control circuit.

FIG. 15A is an electrical schematic of an embodiment of a control circuit. As shown in FIG. 15A, the control circuit 400 is configured to receive the first comparator output OUTPUT_COMPARATOR1 and the second comparator output OUT_COMPARATOR2, and to generate an indicator signal OUTPUT_SIGNAL. The control circuit 400 includes an inverter 510, first and second delay elements 520, 530, NAND gates 540, 550, 560, 570 and inverters 590, 600. The delay elements 520 and 530 are provided to prevent unnecessary switching due to noise. The delay elements 520 and 530 act as a noise filter. The time constant of the delay should be determined according to the time period of noise that is to be eliminated.

The first comparator output OUT_COMPARATOR1 is input and then inverted and coupled to NAND gate 540. A delay element 520 also receives the output of inverter 510, delays the inverter 510 output and inputs the delayed, inverted output of inverter 510 into NAND gate 540.

The second comparator output OUT_COMPARATOR2 is fed directly into one input of NAND gate 550. OUT_COMPARATOR2 is delayed by delay element 530 and then input into NAND gate 550. The outputs of NAND gate 540 and NAND gate 550 are then input to a conventional flip-flop circuit 580 that is constructed using a pair of NAND gates 560 and 570. Alternatively, any bistable multivibrator circuit could be utilized which has two output states and is switched from one state to the other by means of an external signal (trigger). The output of flip-flop circuit 580 is then fed to inverter 590 where the signal is inverted and sent into another inverter 600, which generates the indicator signal OUTPUT_SIGNAL.

Figure 15B:
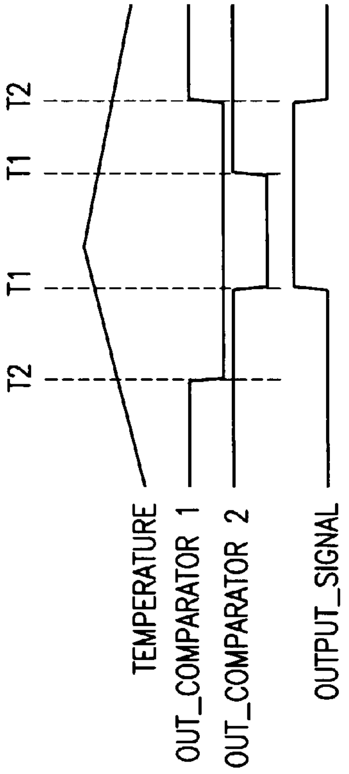
FIG. 15B is a timing diagram that illustrates the operation of the control circuit shown in FIG. 15A.

FIG. 15B is a timing diagram that illustrates the operation of the control circuit shown in FIG. 15A. When temperature increases to temperature T2, OUT_COMPAPATOR2 transitions from logic high to logic low, and when temperature increases to temperature T1, OUT_COMPARATOR1 transitions from logic high to logic low. As shown in FIG. 15B, the indicator signal OUTPUT_SIGNAL transitions from a low level to a high level, when the second comparator output OUT_COMPARATOR2 is low and the first comparator output OUT_COMPARATOR1 transitions from high to low.

When temperature decreases to temperature T1, OUT_COMPARATOR1 transitions from logic low to logic high, and when temperature decreases to temperature T2, OUT_COMPARATOR2 transitions from logic low to logic high. As a result, the indicator signal OUTPUT_SIGNAL stays at a high level until the output of the second comparator OUT_COMPARATOR2 transitions to a logic high level, while the output of the first comparator OUT_COMPARATOR1 is also at a logic high level. When this occurs, the indicator signal OUTPUT_SIGNAL transitions from a logic high level to a logic low level.

As such, indicator signal OUTPUT_SIGNAL has hysteresis characteristics, such that the indicator signal turns on when the temperature increases to a temperature T1 and turns off when the indicator signal decreases to a temperature T2. This is made possible by utilization of a flip-flop circuit 580 and the control circuit 400.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A thermal sensing circuit comprising:

a bandgap voltage reference generator circuit that generates at least a first bandgap reference voltage;

a thermal sensing element that generates the base-to-emitter voltage;

a first comparator that compares the base-to-emitter voltage to the at least first bandgap reference voltage, and generates a comparator output; and a control circuit that generates an indicator signal in response to the comparator output, wherein the bandgap voltage reference generator circuit further comprises:

a reference voltage generator unit comprising:

a first output current source circuit;

a first resistor coupled to the first output current source circuit;

a first voltage reference output node disposed between the first resistor and the first output current source circuit, wherein the first voltage reference output node generates a first reference voltage;

a second resistor coupled to a negative voltage supply; and a second voltage reference output node disposed between the second resistor and at least one of:

a second output current source circuit coupled to a positive voltage supply, and the first resistor, wherein the second voltage reference output node generates a second reference voltage.

2. A thermal sensing circuit comprising:

a bandgap voltage reference generator circuit that generates at least a first bandgap reference voltage;

a thermal sensing element that generates the base-to-emitter voltage;

a first comparator that compares the base-to-emitter voltage to the at least first bandgap reference voltage, and generates a comparator output; and a control circuit that generates an indicator signal in response to the comparator output, wherein the bandgap voltage reference generator circuit further comprises:

a first control loop, comprising:

a first current source circuit that generates a first current and that is coupled to develop a first voltage across a diode;

a parallel combination circuit;

a second current source circuit that generates a second current and that is coupled to develop a second voltage across the parallel combination circuit;

a first amplifier responsive to the first voltage and the second voltage, the amplifier being coupled to influence the first current and the second current, wherein the first and second current source circuits have gates coupled to the first amplifier.

3. A thermal sensing circuit according to claim 2, wherein the bandgap voltage reference generator circuit further comprises:

a second control loop, comprising:

a third resistor; and a third current source circuit that generates a third current that develops a third voltage across the third resistor; and a second amplifier responsive to the first voltage and the third voltage, wherein the second amplifier is coupled to third current source which is responsive to the second amplifier.

4. A thermal sensing circuit according to claim 1, wherein the second voltage reference output node is disposed between the second resistor and the second output current source circuit coupled to a positive voltage supply.

5. A thermal sensing circuit according to claim 1, wherein the second voltage reference output node is disposed between the second resistor and the first resistor.

6. A thermal sensing circuit according to claim 1, wherein the first voltage reference output node is coupled to a third output current source circuit.

7. A thermal sensing circuit according to claim 1, wherein the second voltage reference output node is coupled to a fourth output current source circuit.

8. A thermal sensing circuit according to claim 3, wherein the first reference voltage at the first voltage reference output node is based on ratio of:

the sum of the resistance of the first resistor and the resistance of the second resistor to the resistance of the third resistor.

9. A thermal sensing circuit according to claim 3, wherein the second reference voltage at the second voltage reference output node is based on ratio of the resistance of the second resistor to the resistance of the third resistor.

10. A thermal sensing circuit according to claim 2, wherein the parallel combination circuit comprises a fifth resistor in series with a diode array comprising a plurality of diode connected in parallel.

11. A thermal sensing circuit according to claim 2, wherein the parallel combination circuit comprises a second parallel combination circuit, further comprising:

a first parallel combination circuit comprising a fourth resistor coupled in parallel with the diode.

12. A thermal sensing circuit according to claim 11, wherein the second parallel combination circuit comprises another fourth resistor coupled in parallel with a fifth resistor in series with a diode array.

13. A thermal sensing circuit according to claim 1, wherein the first comparator circuit comprises:

an amplifier responsive to the first bandgap reference voltage and the base-to-emitter voltage; and an inverter coupled to the amplifier, wherein the inverter generates the first comparator output.

14. A thermal sensing circuit comprising:

a bandgap voltage reference generator circuit that generates at least a first bandgap reference voltage;

a thermal sensing element that generates the base-to-emitter voltage;

a first comparator that compares the base-to-emitter voltage to the at least first bandgap reference voltage, and generates a comparator output; and a control circuit that generates an indicator signal in response to the comparator output, wherein the control circuit comprises:

a first delay element that generates a delayed first comparator output and that prevents switching due to noise;

a first NAND gate, responsive to the first comparator output and the delayed first comparator output, that generates a first output;

a second delay element that generates a delayed second comparator output and that prevents switching due to noise;

a second NAND gate, responsive to the second comparator output and the delayed second comparator output, that generates a second output;

a flip-flop circuit, responsive to the first output and the second output, that generates a flip-flop output, wherein the flip-flop output is used to generate the indicator signal, wherein the indicator signal switches to a high level when the temperature increases to a first temperature and switches to a low level when the temperature decreases to a second temperature.

15. A thermal sensing circuit according to claim 14, wherein, when the first comparator output is at a logic high and the indicator signal is at a high level, the indicator signal remains at the high level until the second comparator output transitions to a logic high.

16. A thermal sensing circuit according to claim 14, wherein the second comparator output transitions from logic high to logic low when temperature increases to a second temperature.

17. A thermal sensing circuit according to claim 14, wherein the first comparator output transitions from logic high to logic low when temperature increases to a first temperature.

18. A thermal sensing circuit according to claim 14, wherein the indicator signal transitions from a low level to a high level, when the second comparator output is low and the first comparator output transitions to logic low.

19. A thermal sensing circuit according to claim 14, wherein, when temperature decreases to first temperature, the first comparator output transitions from logic low to logic high, and wherein, when temperature decreases to second temperature, the second comparator output transitions from logic low to logic high.

* * * * *